(12) United States Patent
Suh et al.

(10) Patent No.: US 8,861,732 B2
(45) Date of Patent: Oct. 14, 2014

(54) METHOD AND SYSTEM FOR SUPPORTING SECURITY IN A MOBILE COMMUNICATION SYSTEM

(75) Inventors: Kyung-Joo Suh, Seoul (KR); Beom-Sik Bae, Suwon-si (KR); Han-Na Lim, Seoul (KR); Song-Yean Cho, Seoul (KR); Chae-Gwon Lim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 13/517,371

(22) PCT Filed: Dec. 6, 2010

(86) PCT No.: PCT/KR2010/008683
§ 371 (c)(1),
(2), (4) Date: Jun. 20, 2012

(87) PCT Pub. No.: WO2011/081311
PCT Pub. Date: Jul. 7, 2011

(65) Prior Publication Data
US 2012/0263298 A1 Oct. 18, 2012

(30) Foreign Application Priority Data
Dec. 31, 2009 (KR) .......................... 10-2009-0135483

(51) Int. Cl.
*H04K 1/00* (2006.01)
*H04W 12/04* (2009.01)
*H04W 4/00* (2009.01)
*H04W 8/20* (2009.01)

(52) U.S. Cl.
CPC .............. *H04W 12/04* (2013.01); *H04W 4/001* (2013.01); *H04W 4/003* (2013.01); *H04W 8/20* (2013.01)

USPC .......................................................... 380/255

(58) Field of Classification Search
None
See application file for complete search history.

(56) References Cited

U.S. PATENT DOCUMENTS

| 2004/0229601 A1* | 11/2004 | Zabawskyj et al. ........... 455/417 |
| 2008/0273704 A1 | 11/2008 | Norrman et al. |
| 2008/0285749 A1 | 11/2008 | Suh et al. |
| 2008/0301776 A1* | 12/2008 | Weatherford ..................... 726/3 |

FOREIGN PATENT DOCUMENTS

| KR | 10-2008-0100746 A | 11/2008 |
| KR | 10-2009-0061662 A | 6/2009 |
| WO | 2008/005162 A2 | 1/2008 |

* cited by examiner

*Primary Examiner* — Brandon Hoffman
(74) *Attorney, Agent, or Firm* — Jefferson IP Law, LLP

(57) ABSTRACT

The present invention relates to a mobile communication system, and more particularly, to a method and system for efficiently supporting security in a mobile communication system. The method for supporting the security of a terminal in a mobile communication system according to the present invention comprises: a process of transmitting an information provision request message to a network; a process of performing a verification for the network and security; a process of receiving an information provision response message, comprising an index of an encrypted security key, an International Mobile Subscriber Identity (IMSI), and a security-related profile from the network when the verification is completed; and a process of selecting a security key on the basis of the index of an encrypted security key, and then storing the selected security key, the IMSI, and the profile.

16 Claims, 7 Drawing Sheets

METHOD AND SYSTEM FOR SUPPORTING SECURITY IN A MOBILE COMMUNICATION SYSTEM

TECHNICAL FIELD

The present invention relates generally to a mobile communication system, and more particularly, to a method and system for efficiently supporting security in a mobile communication system.

BACKGROUND ART

3rd Generation Partnership Project (3GPP), a typical system of general mobile communication systems, has defined an Evolved Packet System (EPS) and introduced a Mobility Management Entity (MME) of a network, for next-generation communication.

This mobile communication system has presented a scheme for providing high-speed communication services in the next-generation mobile communication by improving the protocol used in 3GPP 3G Accordingly, the conventional mobile communication system has strengthened the security management scheme such as performing a security mode by introducing the Non Access Stratum (NAS) protocol concept secured in a NAS layer in addition to the authentication process and the security process that is performed in a wireless access layer.

However, the security may not be well ensured when the definition of the current NAS protocol and the definition of security of the related protocol are used to support services between a User Equipment (UE) and a server or between a UE and a UE in a machine-type communication environment.

In the mobile communication system, when a UE selects one operator, it stores security information for the operator and other information, and accesses the operator for communication. When the UE moves to another operator, it should use a Universal Subscriber Identity Module (USIM) or a Universal Integrated Circuit Card (UICC) belonging to the new operator.

Accordingly, a method is required that sets up an operator early, or more efficiently supports a change in operator by improving a process of making it possible to store security and subscriber-related information in a subscriber identity module in which a change in operator is not recorded or an early operator is not set up in a mobile communication system.

DISCLOSURE

Technical Problem

An aspect of exemplary embodiments of the present invention is to provide a method and system in which a UE sets its subscriber information appropriate for a specific operator and a related security key to securely and efficiently support communication with a network in a process where the UE performs machine-type communication or communicates with the network in an evolved mobile communication system, including 3GPP EPS, which supports the NAS protocol and other security-related protocols.

Another aspect of exemplary embodiments of the present invention is to provide a method and system for supporting a UE's selecting an operator and initially storing a security key or minimum setting information for communications, using the NAS protocol which is a protocol between a UE and an MME.

Technical Solution

In accordance with an embodiment of the present invention, there is provided a method for supporting security by a User Equipment (UE) in a mobile communication system. The method includes sending an information provisioning request message to a network; performing verification for security with the network; upon completion of the verification, receiving an information provision response message from the network, the information provision response message including an encrypted index of a security key, an International Mobile Subscriber Identity (IMSI), and a security-related profile; and selecting a security key based on the encrypted index of the security key, and storing the selected security key, the IMSI, and the profile.

In accordance with another embodiment of the present invention, there is provided a method for supporting security by a network in a mobile communication system. The method includes receiving an information provisioning request message from a User Equipment (UE); performing verification for security with the UE; and upon completion of the verification, selecting a security key and an index of the security key, encrypting the index of the security key, and sending an information provision response message including an International Mobile Subscriber Identity (IMSI) and a security-related profile, to the UE.

In accordance with further another embodiment of the present invention, there is provided a mobile communication system for supporting security of a User Equipment (UE). The mobile communication system includes an Authentication Key management Center (AKC) for, upon receiving an information provisioning request message from the UE, verifying the UE based on a Random number (RAND), selecting a security key and an index of the security key, encrypting the index of the security key, and transmitting the security key and the encrypted index of the security key to a Mobility Management Entity (MME); the MME for receiving an International Mobile Subscriber Identity (IMSI) and a security-related profile through a Home Subscriber Server (HSS), and transmitting an information provision response message including a Machine Identity (MID), the encrypted index of the security key, the IMSI, and the profile, to the UE; and the UE for selecting a security key based on the encrypted index of the security key, and storing the selected security key, the IMSI, and the profile.

In accordance with yet another embodiment of the present invention, there is provided a mobile communication system for supporting security of a User Equipment (UE). The mobile communication system includes an Authentication Key management Center (AKC) for, upon receiving an information provisioning request message from the UE, verifying the UE by calculating an authentication vector, selecting a security key and an index of the security key, encrypting the index of the security key, and transmitting the security key and the encrypted index of the security key, to a Mobility Management Entity (MME); the MME for receiving an International Mobile Subscriber Identity (IMSI) and a security-related profile through a Home Subscriber Server (HSS), and sending an information provision response message including a Machine Identity (MID), the encrypted index of the security key, the IMSI, and the profile, to the UE; and the UE for selecting a security key based on the encrypted index of the security key, and storing the selected security key, the IMSI, and the profile.

In accordance with still another embodiment of the present invention, there is provided a mobile communication system for supporting security of a User Equipment (UE). The mobile communication system includes an Authentication Key management Center (AKC) for, upon receiving an information provisioning request message from the UE, calculating an authentication vector, selecting a security key and an index of the security key, encrypting the index of the security key, and transmitting at least one of the security key and the encrypted index of the security key to the UE through a Mobility Management Entity (MME); the MME for receiving a Response parameter (RES) from the UE, verifying the UE based on the RES, receiving an International Mobile Subscriber Identity (IMSI) and a security-related profile through a Home Subscriber Server (HSS), and sending an information provision response message including at least one of the encrypted index of the security key, the IMSI and the profile, to the UE; the HSS for selecting a security key based on the encrypted index of the security key, and generating a derived master key based on the security key and a nonce; and the UE for selecting a security key based on the encrypted index of the security key, and storing the selected security key, the IMSI, and the profile.

Advantageous Effects

The present invention operable as described above has the following effects.

The present invention allows a UE to initially set an operator using NAS or other network protocols and to be assigned a related identity and a security-related parameter, for communication with the operator, thereby facilitating authentication of the UE and smooth execution and communication of security mode commands, making it possible to efficiently manage security of the UE.

BEST MODE

The operational principles of exemplary embodiments of the present invention will be described in detail with reference to the accompanying drawings. In the following description of the present invention, a detailed description of known functions and configurations incorporated herein will be omitted when it may make the subject matter of the present invention rather unclear. The terms described below, terms defined considering their functions in the present invention, may vary depending on users, intentions of the users, or usual practices. Therefore, definitions thereof should be made based on all the details of the specification.

The present invention described below is directed to providing initial information including a security-related key and parameter and an identity for enabling communication to a UE to enable its communication in an operator network when the UE makes machine-type communication using a NAS protocol which is a protocol between a UE and an MME, and other protocols, for a mobile communication system.

In the following detailed description of the present invention, EPS, Evolved Universal Terrestrial Radio Access Network (EUTRAN), Global System for Mobile Communications (GSM)/Evolved Data rates for GSM Evolution (EDGE) Radio Access Network (GERAN), which are based on 3GPP, will be considered, and the present invention may be used in other mobile communication systems as well. Although the present invention will be described with reference to machine-type communication by way of example, it will be understood by those of ordinary skill in the art that various changes in form and details may be made therein without departing from the spirit and scope of the present invention in the process of not only performing the machine-type communication but also performing initial provisioning (storing initial information) so that a UE may be appropriate for the operator.

Figure 1:
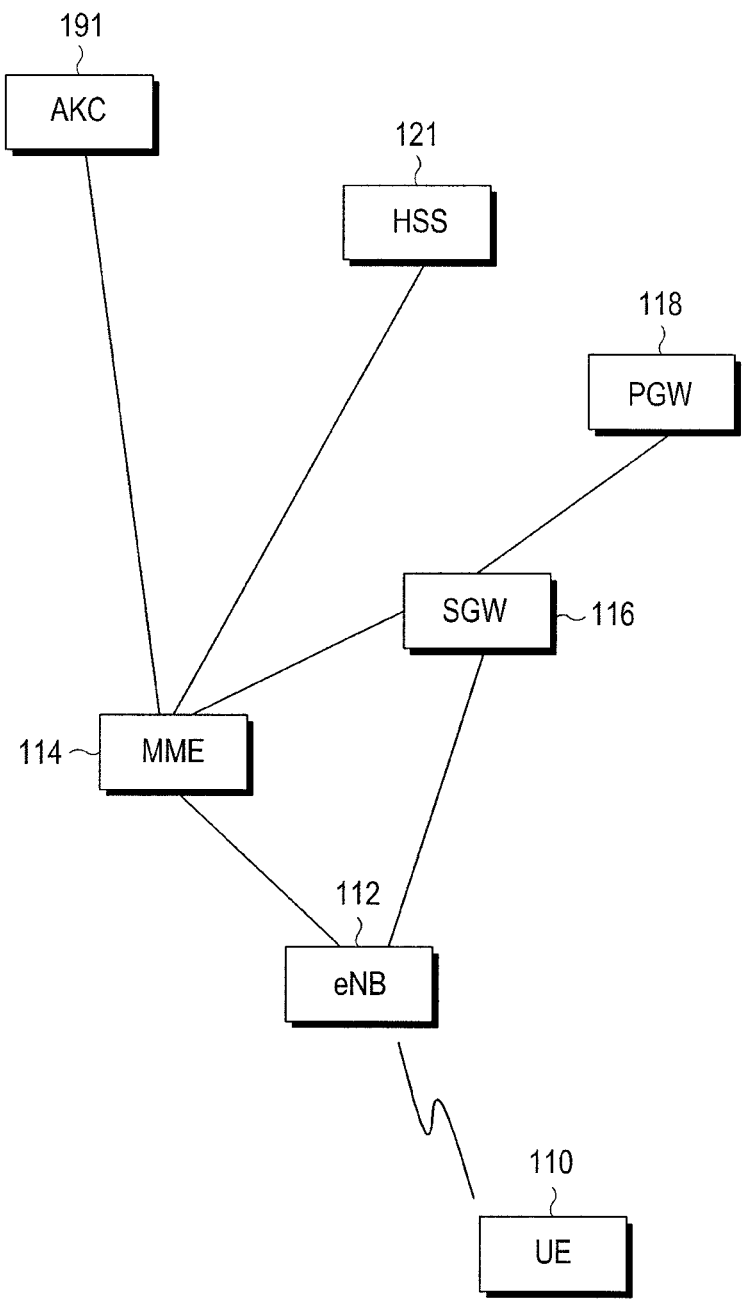
FIG. 1 is a block diagram showing a mobile communication system according to an exemplary embodiment of the present invention.

As shown in FIG. 1 of the specification, an embodiment of the present invention is aimed to provide initial information including a security parameter and an identity to a UE when the UE performs machine-type communication in a EUTRAN, so the UE may support security during authentication and connection with the network such as an MME. It will be understood by those of ordinary skill in the art that various changes in form and details may be made therein without departing from the spirit and scope of the present invention. For example, the embodiment of the present invention may be applied even in other mobile communication systems having similar technical backgrounds and channel formats, having similar network architectures and protocols, and/or having protocols which are different in structure but similar in operation.

FIG. 1 shows a mobile communication system according to an exemplary embodiment of the present invention, in which architecture of a 3GPP EPS system is shown by way of example. The present invention will be described focusing on a EUTRAN, and this method may be used even in other similar mobile communication systems.

Referring to FIG. 1, an Evolved Node Base Station (eNB) 112 sets up wireless connection to a User Equipment (UE) 110 located in each of its cells or service areas and performs communication with it.

The UE 110 accesses a packet data network such as the Internet via the eNB 112 and a Serving Gateway (SGW) 116.

As a major network entity of the packet data network, a Packet Data Network Gate Way (PGW) 118 serves as a Home Agent (HA).

An MME 114 manages mobility, location and registration of the UE 110.

To manage authentication information and service information for the UE 110 and its user, a Home Subscriber Server (HSS) 121 is connected to the MME 114.

A data path and an interface for managing mobility of the UE 110 are present between the eNB 112 and the SGW116, and between the MME114 and the SGW116.

The UE 110 and the MME 114 perform mobility management and session management by communicating with each other using a NAS protocol stack. An Authentication Key management Center (AKC) 191 manages a security parameter related to the operator, especially a security-related key, in a USIM or a Universal Integrated Circuit Card (UICC) of the UE 110.

Although it is assumed that the UE 110 communicates through the MME 114, the eNB 112, the SGW 116 and the PGW 118, which are general EPS network entities, the mechanism may operate similarly that operates even when it has separate MME, eNB, SGW and PGW for machine-type communication. The network may be classified into several different RAT types such as EUTRAN, UTRAN, and GERAN.

A description will now be made of a method in which the UE 110, the MME 114, the HSS 121, and the AKC 191 efficiently operate based on the NAS protocol or other protocols in the above-described mobile communication system according to exemplary embodiments of the present invention.

Figure 2:
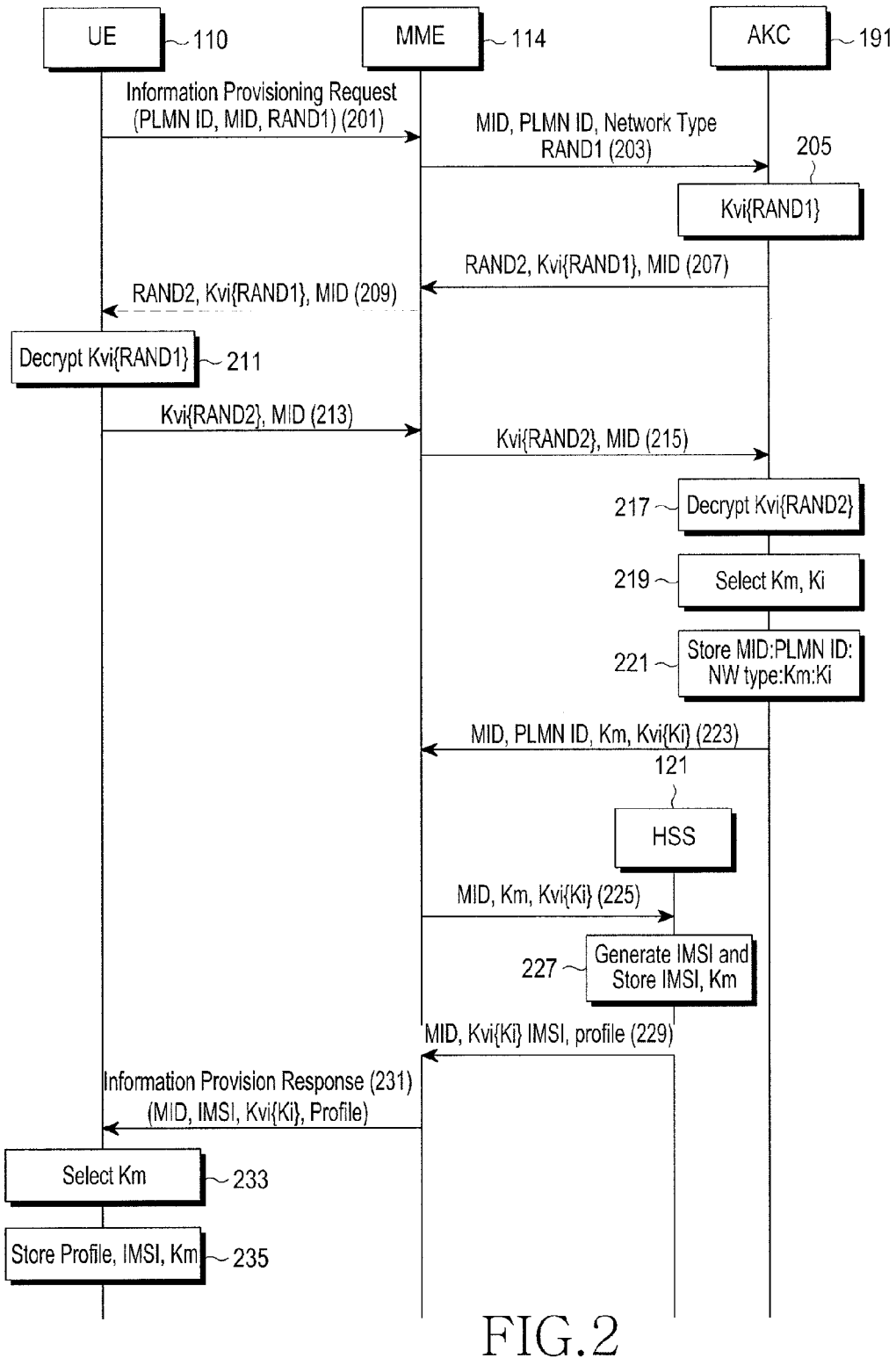
FIG. 2 is a message flow diagram showing a method for providing initial information to a UE in a mobile communication system according to a first embodiment of the present invention.

FIG. 2 shows a method for providing initial information to a UE in a mobile communication system according to a first embodiment of the present invention.

In the first embodiment of the present invention, the AKC 191 verifies the UE 110 based on a Random Number (RAND), and then provides initial information to the UE 110.

Referring to FIG. 2, in step 201, the UE 110 sends an information provisioning request message for requesting initial information for security, to the MME 114. In step 201, the UE 110 may access the network only in a limited mode for an access to the AKC 191 because the UE 110 has no other information such as security and identity based on which it may receive services in a network of the operator. The information provisioning request message includes a Machine Identity (MID), a Public Land Mobile Network Identity (PLMN ID), and a RAND1. The MID, an identity used by the AKC 191 to identify the UE 110 or the USIM/SIM/UICC, is assigned by a vendor making the UE 110 or its USIM/SIM/UICC, and is used by the AKC 191 to identify the UE 110. The USIM, Subscriber Identity Module (SIM) and UICC are modules or cards, in which subscriber authentication information for identifying a subscriber of the UE 110 is contained. In the following description, the USIM, SIM and UICC, as part of the UE 110, perform security and identity-related operations in the UE 110. The RAND1 is transmitted from the UE 110 to the AKC 191, and it may be used by the UE 110 to verify the AKC 191 which is the other party for communication, as the UE 110 decrypts a value that the AKC 191 sent after encrypting the RAND1.

In step 203, the MME 114 transmits information (MID, PLMN ID, and RAND1) included in the information provisioning request message received from the UE 110 to the AKC 191, and additionally transmits even Network Type indicating its network type to the AKC 191. The Network Type may be information about a network in a wire/wireless section of an operator network such as an EPS network (or EUTRAN), UTRAN, and GSM/EDGE Radio Access Network (GERAN).

In step 205, the AKC 191 encrypts the RAND1 received from the UE 110 via the MME 114 into a shared key Kvi shared by the UE 110 and the AKC 191 (Kvi{RAND1}). In step 207, the AKC 191 transmits, to the MME 114, Kvi {RAND1} obtained by encrypting the RAND1, and a RAND2 and a MID which will be used to verify the UE 110. Thereafter, in step 209, the MME 114 transmits the RAND 2, Kvi {RAND1} and MID received from the AKC 191 to the UE 110. In step 211, the UE 110 verifies the AKC 191 by decrypting Kvi {RAND1} received from the MME 114. In step 213, the UE 110 transmits, to the MME 114, a MID and Kvi{RAND2} obtained by encrypting the RAND2 received from the AKC 191 via the MME 114 with the shared key Kvi. In step 215, the MME 114 transmits the Kvi{RAND2} and MID received from the UE 110 to the AKC 191.

In step 217, the AKC 191 verifies the UE 110 by decrypting the Kvi{RAND2} received from the MME 114. Thereafter, in step 219, the AKC 191 selects a security key Km for security and an identity (or key index) Ki indicating the security key. The security key is a security key value selected for the operator to which the MME 114 belongs. In step 221, the AKC 191 stores information related to the UE 110 or its USIM/UICC/SIM, and the information related to the UE or its USIM/UICC/SIM includes MID, PLMN ID, Network (NW) Type, Km and Ki, which are identities of the UE 110 or its USIM/UICC/SIM. Thereafter, in step 223, the AKC 191 transmits, to the MME 114, the MID, PLMN ID, Network Type, Km, and Kvi{Ki} obtained by encrypting Ki with the shared key Kvi.

In step 225, the MME 114 transmits the MID, Km and Kvi{Ki} received from the AKC 191 to the HSS 121. In step 227, the HSS 121 generates an IMSI which is an identity of the UE 110, and stores the IMSI of the UE 110 and Km. Thereafter, in step 229, the HSS 121 transmits, to the MME 114, a profile which is information needed to configure the UE 110 or its USIM/UICC/SIM to match with the operator network, along with the MID, Kvi{Ki} and IMSI information.

Although throughout the specification, Km may be used in the form of a master key (i.e., root key) as in an embodiment of the present invention where it is assigned to the operator, the Km may also be used as a seed that is assigned to an operator and used by the operator to generate a security-strengthened key for each operator. In other words, Km may be used as another derived master key Kdm serving as a master key that the MME 114 of the operator network uses in the operator network based on the Km. As such, the master key may be Km or Kdm, and from the master key, the operator network generates an encryption key KASME, and may generate a NAS integrity key KNASint and a NAS encryption key KNASenc based on the encryption key. Throughout the specification, the profile, which is information needed to configure the UE 110 or its USIM/UICC/SIM to match with the operator network, may be an algorithm meaning a security function in Authentication and Key Agreement (AKA) which is an authentication process, or an algorithm for encryption or integrity protection such as SNOW (or Advanced Encryption Standard (AES), and may include information such as access control class, emergency call codes, operator PLMN list, and home network domain.

Thereafter, in step 231, the MME 114 sends an information provision response message to the UE 110, and the information provision response message includes MID, IMSI, Kvi{Ki}, and profile information. In step 233, the UE 110 selects Km based on Kvi{Ki} included in the information provision response message. In step 235, the UE 110 stores the operator-related profile and IMSI received from the MME 114, and the selected Km.

Figure 3:
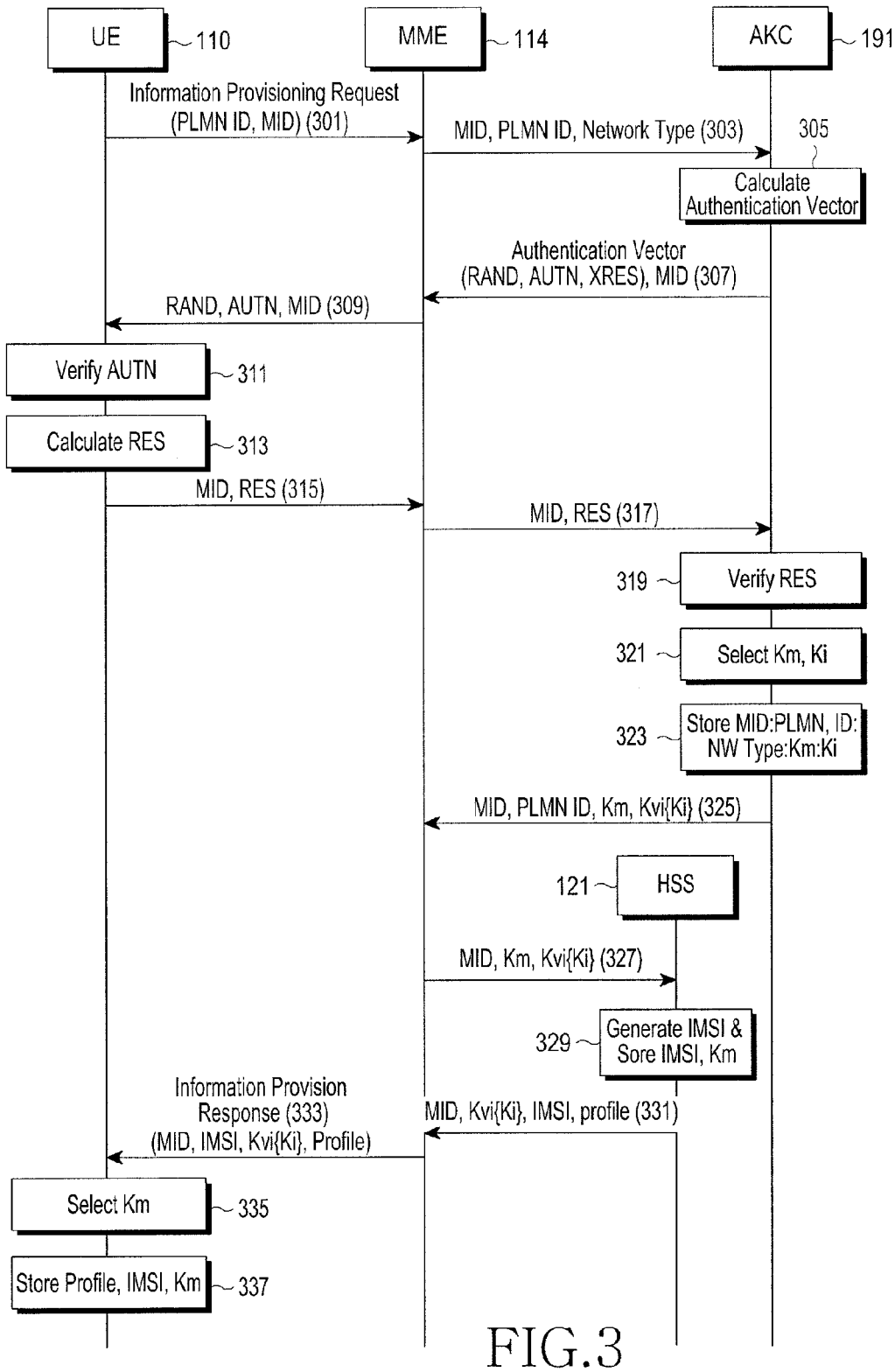
FIG. 3 is a message flow diagram showing a method for providing initial information to a UE in a mobile communication system according to a second embodiment of the present invention.

FIG. 3 shows a method for providing initial information to a UE in a mobile communication system according to a second embodiment of the present invention.

In the second embodiment of the present invention, the AKC 191 verifies the UE 110 based on a Response parameter (RES), and then provides initial information to the UE 110.

Referring to FIG. 3, in step 301, the UE 110 transmits an information provisioning request message to the MME 114. In step 301, the UE 110 may access the network only in a limited mode for an access to the AKC 191 because the UE 110 has no other information such as security and identity based on which it may receive services in a network of the operator. The information provisioning request message includes a MID and a PLMN ID.

In step 303, the MME 114 transmits information (MID and PLMN ID) included in the information provisioning request message received from the UE 110 to the AKC 191, and transmits even Network Type indicating its network type to the AKC 191.

In step 305, the AKC 191 calculates an authentication vector. The authentication vector includes values such as a Random Challenge (RAND), an Expected Response (XRES), and an Authentication Token (AUTN).

Thereafter, in step 307, the AKC 191 transmits the authentication vector including the RAND, AUTN and XRES to the MME 114 along with a MID. In other words, the parameters may be sent to the MME 114 in the form of the authentication vector including RAND, AUTN and XRES, so the MME 114 may verify the UE 110. When the verification is made not in the MME 114 but in the AKC 191, only the parameters such as RAND and AUTN may be delivered to the MME 114.

In step 309, the MME 114 transmits the RAND and AUTN to the UE 110 along with the MID in order to indicate the values sent to the UE 110, among the values received from the AKC 191. In step 311, the UE 110 or its USIM/UICC/SIM verifies the AUTN by comparing an Expected Message Authentication Code (XMAC) with a Massage Authentication Code (MAC). In other words, the process in which the UE 110 verifies the AUTN in step 311 is to verify the network.

Thereafter, in step 313, the UE 110 or its USIM/UICC/SIM calculates a RES after the AUTN is verified, and transmits the MID and RES to the MME 114 in step 315. In step 317, the MME 114 transmits the MID and RES received from the UE 110 to the AKC 191. In step 319, the AKC 191 completes verification of the UE 110 by comparing the RES and XRES. In step 321, the AKC 191 selects a security key Km and an identity Ki. The security key is a security key value selected for the operator to which the MME 114 belongs. In step 323, the AKC 191 stores information related to the UE or its USIM/UICC/SIM, and this information includes MID (identity of the UE or its USIM/UICC/SIM), PLMN ID (PLMN identity), Network Type, Km and Ki. Thereafter, in step 325, the AKC 191 transmits, to the MME 114, MID, PLMN ID, Km, and an encrypted key index (i.e., Kvi{Ki}) which is information obtained by encrypting Ki with Kvi which is a shared key between the AKC 191 and the UE 110. Thereafter, in step 327, the MME 114 transmits the MID, Km and Kvi{Ki} to the HSS 121.

In step 329, the HSS 121 generates an IMSI or an identity of the UE 110 and stores the IMSI of the UE 110 and Km. Thereafter, in step 331, the HSS 121 transmits a profile, which is information needed to configure the UE 110 or its USIM/UICC/SIM to match with the operator network, to the MME 114 along with the MID, Kvi{Ki} and IMSI.

Thereafter, in step 333, the MME 114 sends an information provision response message to the UE 110, and the information provision response message includes MID, IMSI, Kvi{Ki}, and profile information. The UE 110 selects Km based on Kvi{Ki} included in the information provision response message in step 335, and stores the operator-related profile, IMSI and Km in step 337.

Figure 4:
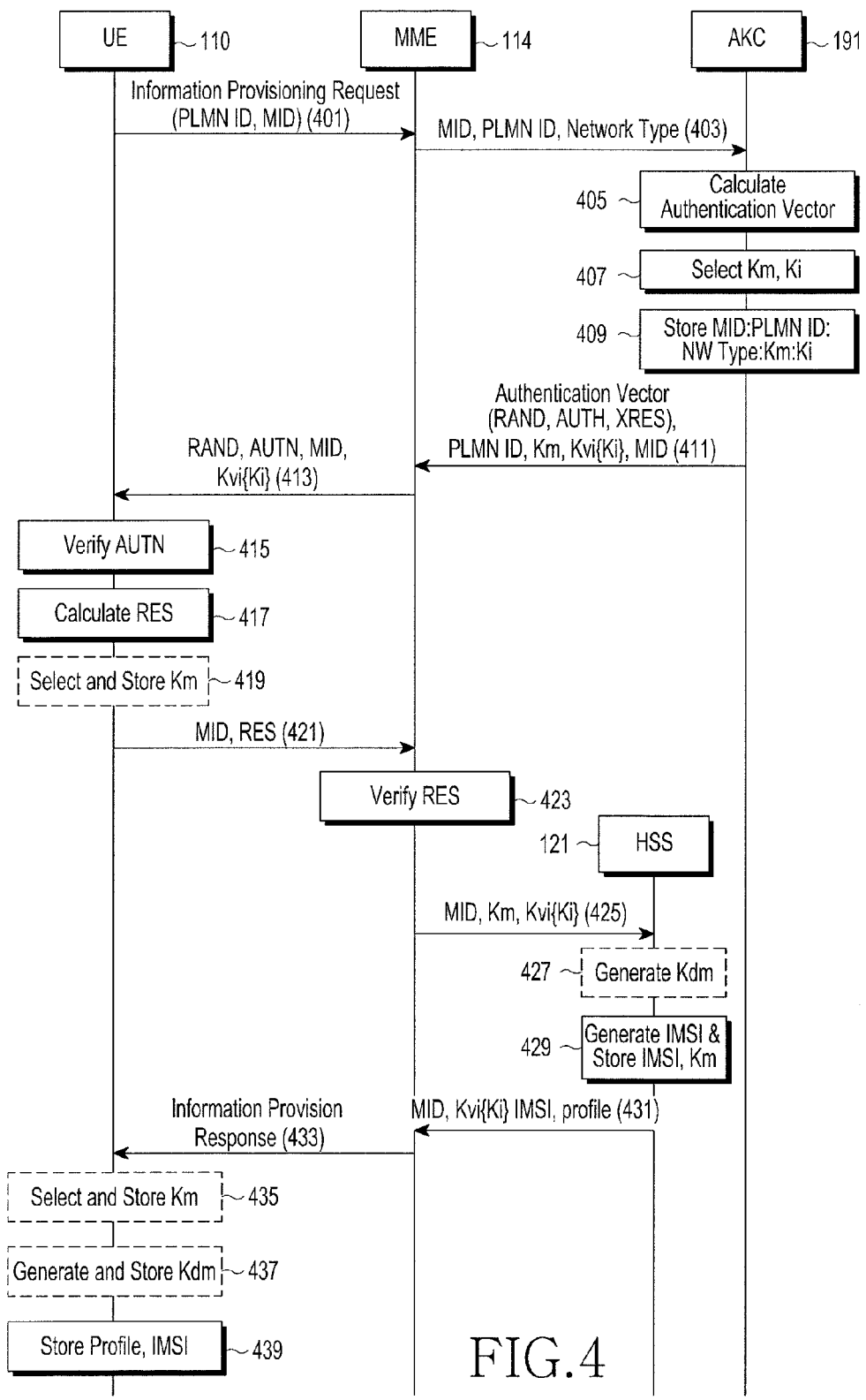
FIG. 4 is a message flow diagram showing a method for providing initial information to a UE in a mobile communication system according to a third embodiment of the present invention.

FIG. 4 shows a method for providing initial information to a UE in a mobile communication system according to a third embodiment of the present invention.

In the third embodiment of the present invention, the MME 114 verifies the UE 110 based on a RES, and then provides initial information to the UE 110.

Referring to FIG. 4, in step 401, the UE 110 transmits an information provisioning request message to the MME 114. In step 401, the UE 110 may access the network only in a limited mode for an access to the AKC 191 because the UE 110 has no other information such as security and identity based on which it may receive services in a network of the operator. The information provisioning request message includes a MID and a PLMN ID.

In step 403, the MME 114 transmits information (MID and PLMN ID) included in the information provisioning request message received from the UE 110 to the AKC 191, and transmits even Network Type indicating its network type to the AKC 191.

In step 405, the AKC 191 calculates an authentication vector based on the information received from the MME 114. The authentication vector includes information such as RAND, XRES and AUTN. Thereafter, in step 407, the AKC 191 selects a security key Km for security and an identity Ki indicating the Km. The Km is a security key value selected for the operator to which the MME 114 belongs. In step 409, the AKC 191 stores information related to the UE 110 or its USIM/UICC/SIM, and this information includes a MID (or identity of UE or its USIM/UICC/SIM), PLMN ID (or PLMN identity), Network Type, Km and Ki.

In step 411, the AKC 191 transmits, to the MME 114, the authentication vector (including RAND and AUTN to be transmitted to the UE 110, and XRES), MID, PLMN ID, Km, and an encrypted key index value Kvi{Ki}. As the AKC 191 delivers the authentication vector to the MME 114, the MME 114, not the AKC 191, may verify the USIM/UICC/SIM of the UE 110 by comparing the RES value transmitted from the UE 110 with the XRES.

Although Km may be used in the form of a master key as in an embodiment of the present invention where it is assigned to the operator, the Km may also be used as a seed that is assigned to an operator and used by the operator to generate a security-strengthened key for each operator. In other words, Km may be used as another derived master key Kdm serving as a master key that the MME 114 of the operator network uses in the operator network based on the Km. As such, the master key may be Km or Kdm, and from the master key, the operator network generates an encryption key KASME, and may generate a NAS integrity key KNASint and a NAS encryption key KNASenc based on the encryption key. The process related to the Km, i.e., the process related to the master key and derived master key Kdm, will be described with reference to steps 413, 419, 427, 433, 435, and 437.

Thereafter, in step 413, the MME 114 transmits MID, RAND, AUTN and Kvi{Ki} among the values received from the AKC 191, to the UE 110. The Kvi{Ki} may be transmitted not in step 413, but in step 433. When the Kvi{Ki} is transmitted in step 413, the UE 110 may select in step 419 Km based on the Kvi{Ki} transmitted in step 413. The Km selected and stored in step 419 may be used as a security master key, or may be used as a parameter based on which the UE 110 will generate a derived master key in step 437. When the Km is used as a master key, it may be delivered not in the form of steps 413 and 419, but in the form of steps 433 and 435.

In step 415, the UE 110 or its USIM/UICC/SIM verifies the AUTN received from the MME 114. In other rods, in step 415, the UE 110 or its USIM/UICC/SIM verifies the AUTN by comparing a XMAC with a MAC. Verifying the AUTN is verifying the network.

Thereafter, in step 417, the UE 110 or its USIM/UICC/SIM calculates a RES if the AUTN is verified.

In step 421, the UE 110 transmits the MID and RES to the MME 114. A nonce value may also be transmitted from the UE 110 to the MME 114, in order to be used as a parameter for generating Kdm from Km in steps 425 and 427.

In step 423, the MME 114 completes verification of the UE 110 by comparing the RES with the XRES.

Thereafter, in step 425, the MME 114 transmits MID, Km and Kvi {Ki} to the HSS 121, and when Kdm is used, the MME 114 additionally transmits a nonce value to the HSS 121. When Kdm is used, the HSS 121 generates Kdm by using the received Km and nonce as parameters, in step 427.

In step 429, the HSS 121 generates an IMSI or an identity of the UE 110, and stores it with Km or the generated Kdm.

In step 431, the HSS 121 transmits, to the UE 110, the MID, Kvi{Ki}, IMSI information, and a profile which is information needed to configure the UE 110 or its USIM/UICC/SIM to match with the operator network.

Thereafter, in step 433, the MME 114 sends an information provision response message to the UE 110, and the information provision response message MID, IMSI, Kvi{Ki}, and profile information. Optionally, the Kvi{Ki} may be transmitted not in step 413, but in step 433.

When Kvi{Ki} is transmitted in step 433, the UE 110 selects Km based on Kvi{Ki} included in the received information provision response message in step 435. As mentioned above, Km may be selected in step 419. Thereafter, in step 437, the UE 110 may generate Kdm by using Km and nonce as parameters when it uses Kdm. The nonce is the same value as that transmitted in steps 421 and 425, and the Km used as a parameter may be a value selected in step 419 or 435, and may be generated based on the operator-related profile. In step 439, the UE 110 stores the operator-related profile and the IMSI.

Operations of the UE 110, MME 114 and AKC 191 that operate according to the second and third embodiments using the RES, among the embodiments of the present invention, will be described below.

Figure 5:
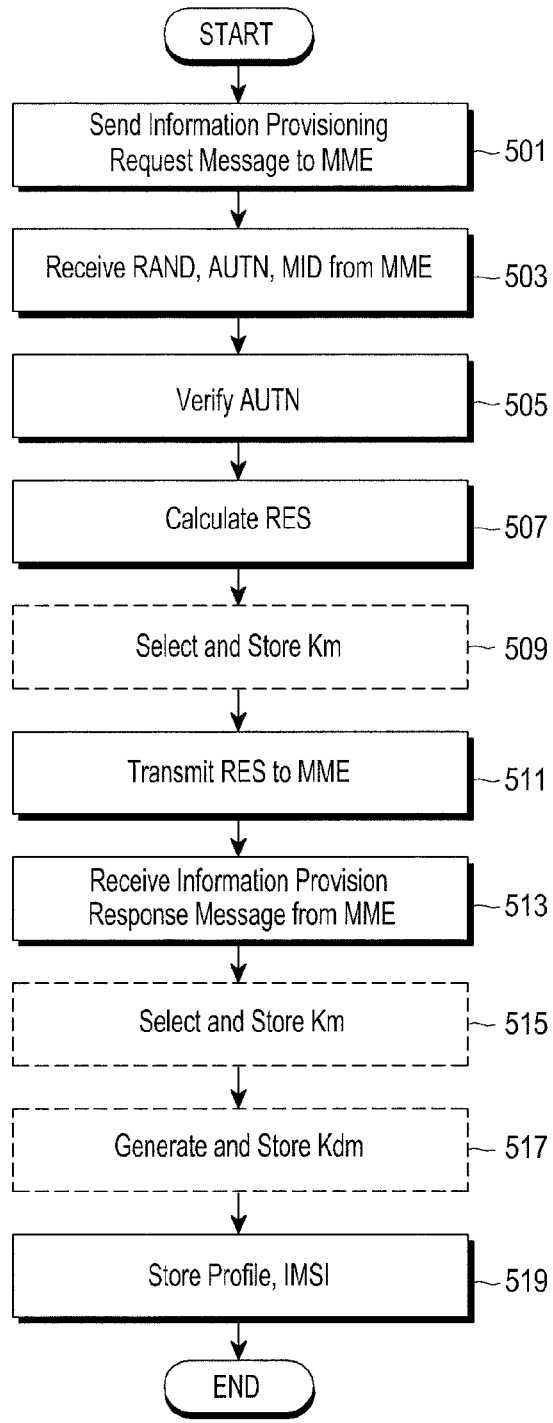
FIG. 5 is a flowchart showing a UE's operation for receiving initial information in a mobile communication system according to the second and third embodiments of the present invention.

FIG. 5 shows a UE's operation for receiving initial information in a mobile communication system according to the second and third embodiments of the present invention.

Referring to FIG. 5, the UE 110 sends an information provisioning request message to the MME 114 in step 501. In step 503, the UE 110 receives a RAND and an AUTN from the MME 114 along with a MID. Additionally, the UE 110 optionally receives a value of Kvi{Ki} from the MME 114 in step 503 according to the third embodiment of the present invention, if it generates Kdm.

In step 505, the UE 110 verifies the AUTN received from the MME 114. In other words, in step 505, the UE 110 compares an XMAC in the AUTN with a MAC calculated by the USIM/SIM, for AUTN verification. Through the process of step 505, the UE 110 verifies the network.

Thereafter, in step 507, the UE 110 calculates a RES if the AUTN is verified.

Additionally, the UE 110 may select and store Km in step 509, if it receives Kvi{Ki} in step 503 according to the third embodiment of the present invention. Step 509 is used when the UE 110 receives Kvi{Ki} as in step 503, and derives Kdm based on the Km in step 517. Otherwise, in step 515, the UE 110 receives an information provision response message from the MME 114, and then selects and stores Km.

Again, in step 511, the UE 110 transmits the calculated RES to the MME 114. Also, in step 511, the UE 110 transmits a nonce to the MME 114 along with the calculated RES if it derives Kdm.

Thereafter, in step 513, the UE 110 receives an information provision response message from the MME 114. In step 515, the UE 110 selects and stores Km to be used in the operator network, based on Kvi {Ki} included in the received information provision response message. As described above, step 509 is performed when the UE 110 generates Kdm from Km as in step 517. Otherwise, if the UE 110 uses the Km as a master key, the UE 110 selects and stores Km as in step 515.

When using Kdm, the UE 110 generates Kdm from the selected Km and a nonce in step 517.

In step 519, the UE 110 stores a profile needed to configure the UE 110 or its USIM/SIM/UICC, and an identity or an IMSI of the UE 110.

Figure 6:
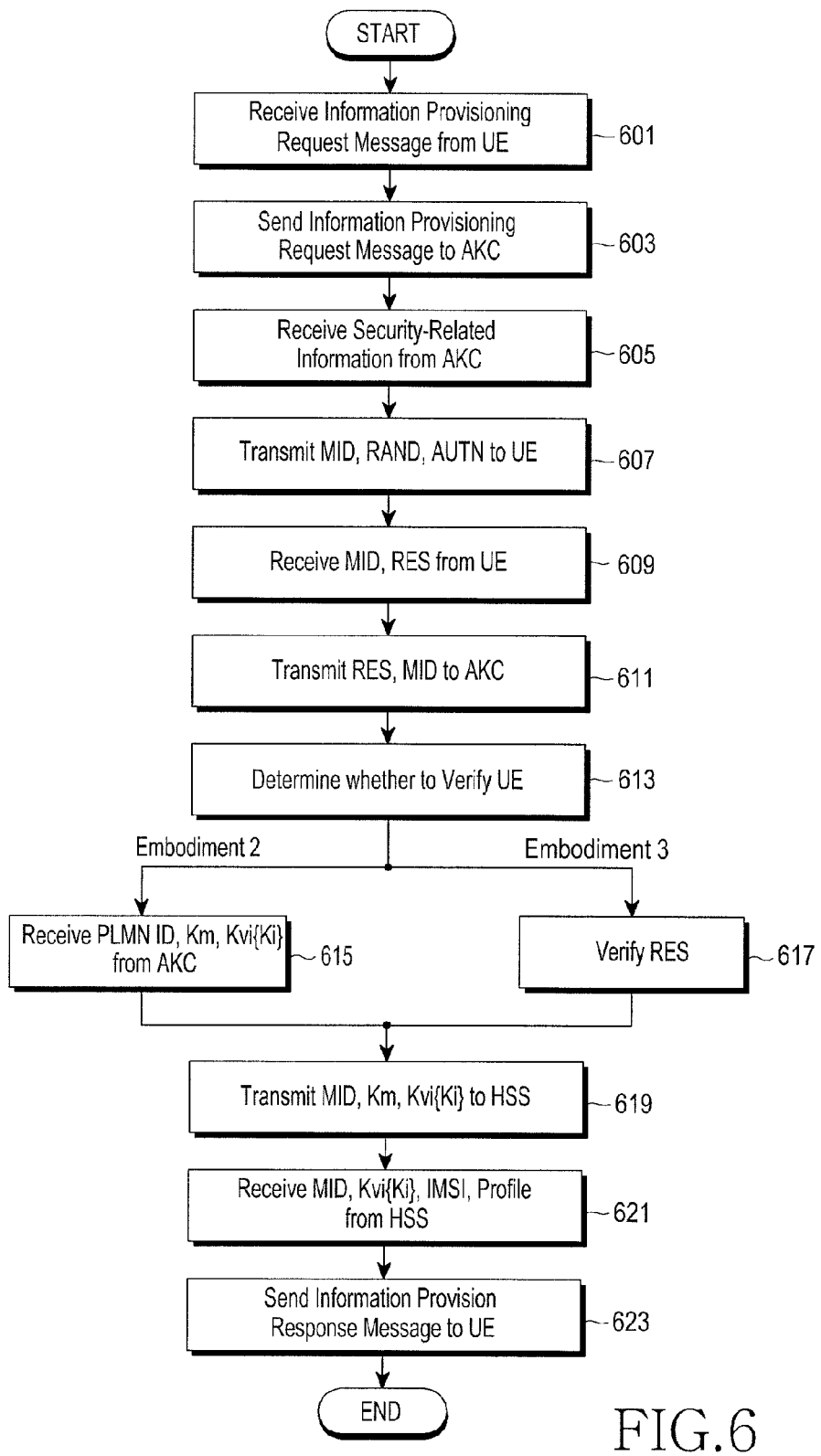
FIG. 6 is a flowchart showing an MME's operation for providing initial information in a mobile communication system according to the second and third embodiments of the present invention.

FIG. 6 shows an MME's operation for providing initial information in a mobile communication system according to the second and third embodiments of the present invention.

Referring to FIG. 6, the MME 114 receives an information provisioning request message from the UE 110 in step 601. In step 603, the MME 114 sends the information provisioning request message received from the UE 110 to the AKC 191. In step 605, the MME 114 receives security-related information of the UE 110 from the AKC 191. The security-related information includes at least one of authentication vector (RAND, AUTN, XRES), MID, PLMN ID, Km and Kvi{Ki}.

Thereafter, in step 607, the MME 114 transmits the RAND, AUTN and MID to the UE 110. The MME 114 additionally transmits Kvi{Ki} to the UE 110, when the UE 110 selects Km by using Ki as an index and generates a derived master key by using Kdm as a parameter. Accordingly, when the MME 114 transmits the Kvi{Ki} to the UE 110 in step 607, the MME 114 does not include Kvi{Ki} in an information provision response message in step 623.

Thereafter, in step 609, the MME 114 receives, from the UE 110, a MID, a RES, and a nonce needed when Kdm should be generated in the HSS 121.

In step 611, the MME 114 transmits the RES and MID to the AKC 191.

In step 613, the MME 114 may verify the UE 110 by checking the verification information received in step 605. Otherwise, when the AKC 191 performs the verification, the MME 114 may simply serve as a messenger between the AKC 191 and the UE 110, enabling two different embodiments. In other words, if the received security-related information includes an authentication vector (RAND, AUTN and XRES) and a MID in step 613, the MME 114 proceeds to step 615 as one of an embodiment where verification of the UE 110 is not performed. If the received verification information includes all of the authentication vector (RAND, AUTN and XRES), MID, PLMN ID, Km and Kvi{Ki}, the MME 114 proceeds to step 617 to perform verification of the UE 110 as a case where a function of the MME 114 includes a function enabling UE verification.

In step 615, the MME 114 receives PLMN ID, Km and Kvi{Ki} from the AKC 191 that has verified the UE 110.

However, in step 617, the MME 114 verifies a RES based on the authentication vector (RAND, AUTN and XRES) in the received security-related information. A process of verifying a RES is verifying the UE 110.

Thereafter, the MME 114 transmits MID, Km and Kvi{Ki} to the HSS 121 in step 619, and receives MID, Kvi{Ki}, IMSI and profile from the HSS 121 in step 621. In step 623, the MME 114 transmits the MID, Kvi{Ki}, IMSI, and profile information to the UE 110 with an information provision response message.

Figure 7:
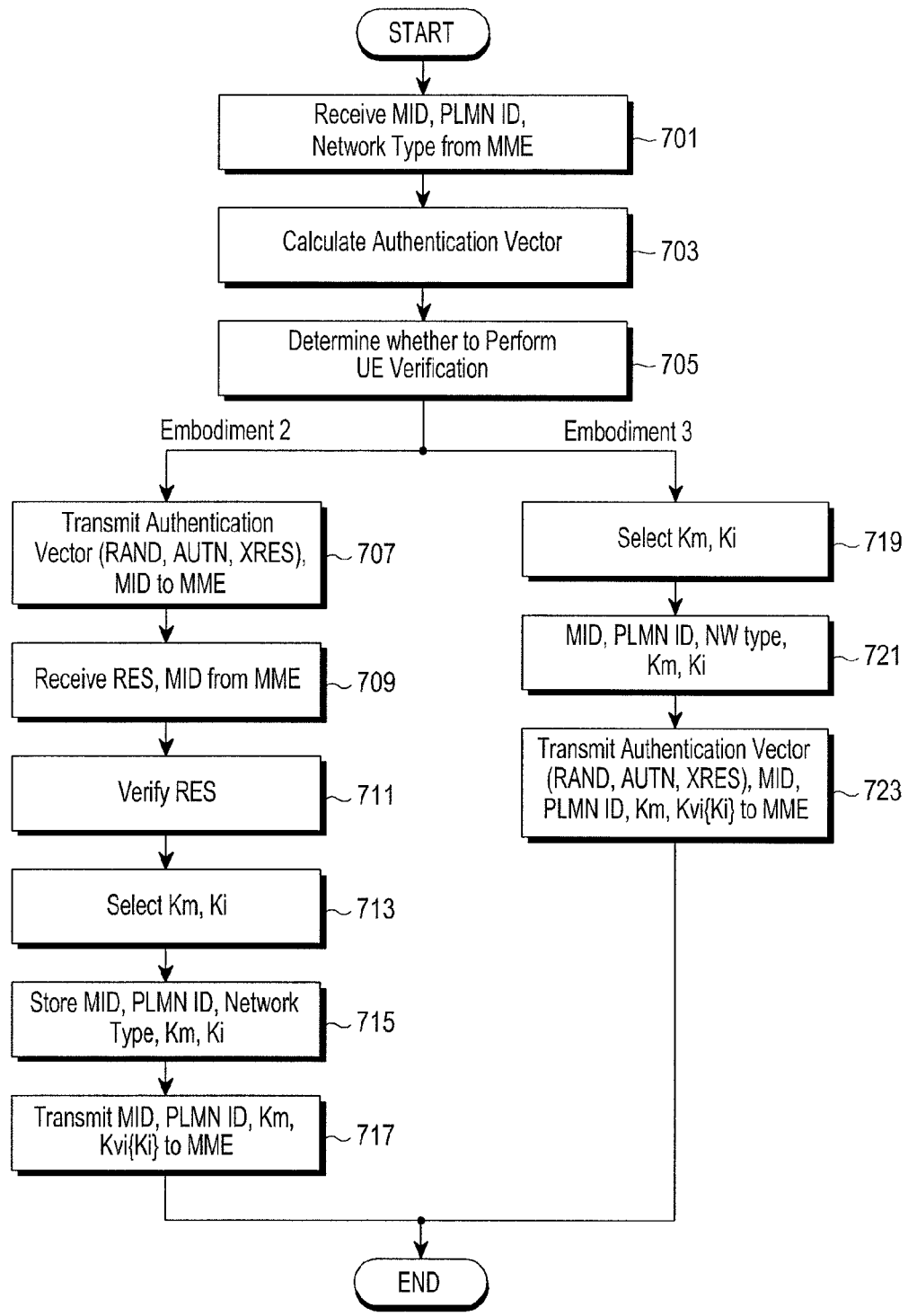
FIG. 7 is a flowchart showing an AKC's operation for providing initial information in a mobile communication system according to the second and third embodiments of the present invention.

FIG. 7 shows an AKC's operation for providing initial information in a mobile communication system according to the second and third embodiments of the present invention.

Referring to FIG. 7, the AKC 191 receives MID, PLMN ID and network type information from the MME 114 in step 701, and calculates an authentication vector in step 703.

The AKC 191 enables two different embodiments depending on whether it performs verification of the UE 110, i.e., depending on its function. In an embodiment where the AKC 191 performs verification of the UE 110, the AKC 191 proceeds to step 707. In another embodiment where UE verification is performed in the MME 114, the AKC 191 proceeds to step 719.

In step 707, the AKC 191 transmits the authentication vector (RAND, AUTN, and XRES) and the MID to the MME 114. Upon receiving the RES and MID from the MME 114 in step 709, the AKC 191 verifies the UE 110 by verifying the RES in step 711.

The AKC 191 selects Km and Ki in step 713, and stores MID, PLMN ID, Network Type, Km, and Ki in step 715. Thereafter, in step 717, the AKC 191 transmits the MID, PLMN ID, Km and Kvi{Ki} to the MME 114.

However, when the AKC 191 proceeds from step 705 to step 719, the verification of the UE 110 is performed not in the AKC 191 but in the MME 114. The AKC 191 selects Km and Ki in step 719, and stores MID, PLMN ID, Network type, Km and Ki in step 721. In step 723, the AKC 191 transmits the authentication vector (RAND, AUTN, and XRES), MID, PLMN ID, Km and Kvi{Ki} to the MME 114.

While the present invention has been particularly shown and described with reference to embodiments thereof, it will be understood by those of ordinary skill in the art that various changes in form and details may be made therein without departing from the spirit and scope of the present invention as defined by the following claims.

The invention claimed is:

1. A method for supporting security by a User Equipment (UE) in a mobile communication system, comprising:
sending an information provisioning request message to a network;
performing verification for security with the network;
upon completion of the verification, receiving an information provision response message from the network, the information provision response message including an encrypted index of a security key, an International Mobile Subscriber Identity (IMSI), and a security-related profile; and
selecting a security key based on the encrypted index of the security key, and storing the selected security key, the IMSI, and the profile.

2. The method of claim 1, wherein the information provisioning request message includes at least one of a Public Land Mobile Network Identity (PLMN ID), a Machine IDentity (MID) and a Random Number (RAND).

3. The method of claim 1, wherein the performing verification comprises verifying the network by decrypting an encrypted first random number (RAND1) received from the network, encrypting a second random number (RAND2) received from the network, and transmitting the encrypted second random number (RAND2) to the network.

4. The method of claim 1, wherein the performing verification comprises:
receiving an authentication vector including a random challenge (RAND) and an authentication token (AUTN), from the network;
verifying the AUTN, generating a Response parameter (RES) used for verification of the UE, and transmitting the RES to the network; and
selecting the security key based on the information provision response message, or the RAND, the AUTN, and the encrypted index of the security key.

5. The method of claim 1, further comprising:
generating a derived master key based on the security key and a nonce; and
storing the derived master key.

6. A method for supporting security by a network in a mobile communication system, comprising:
receiving an information provisioning request message from a User Equipment (UE);
performing verification for security with the UE; and
upon completion of the verification, selecting a security key and an index of the security key, encrypting the index of the security key, and sending an information provision response message including an International Mobile Subscriber Identity (IMSI) and a security-related profile, to the UE through a Mobility Management Entity (MME).

7. The method of claim 6, wherein the information provisioning request message includes a Public Land Mobile Network Identity (PLMN ID), a Machine IDentity (MID), and a RAND1.

8. The method of claim 6, wherein the information provisioning response message includes at least one of a MID, the IMSI, the encrypted index of the security key, the profile, a PLMN ID, a MID, and a network type.

9. The method of claim 6, wherein the performing verification comprises:
encrypting a first random number (RAND1) included in the information provisioning request message, and transmitting to the UE the encrypted RAND1 and a second random number (RAND2) for verifying the UE;
receiving an encrypted RAND2 from the UE; and
verifying the UE by decrypting the encrypted RAND2.

10. A User Equipment (UE) for supporting security of the UE, the UE comprising:
a transmitter configured to send an information provisioning request message to a network;
a controller configured:
to perform verification for security with the network,
upon completion of the verification, if a receiver receives an information provision response message from the network, the information provision response message including an encrypted index of a security key, an International Mobile Subscriber Identity (IMSI), and a security-related profile, to select a security key based on the encrypted index of the security key, and
to store the selected security key, the IMSI, and the profile.

11. The UE of claim 10, wherein the information provisioning request message includes a Public Land Mobile Network Identity (PLMN ID), a MID, and a first random number (RAND1).

12. The UE of claim 10, wherein the controller verifies the network by decrypting an encrypted first random number (RAND1) received from the network, encrypts a second random number (RAND2) received from the network, and controls the transmitter to transmit the encrypted second random number (RAND2) to the network.

13. An apparatus for supporting security of a User Equipment (UE), comprising:

a controller configured to, upon receiving an information provisioning request message from the UE through a receiver, verify the UE by calculating an authentication vector, to select a security key and an index of the security key, to encrypt the index of the security key, and to control a transmitter to transmit an information provision response message including an International Mobile Subscriber Identity (IMSI) and a security-related profile to the UE through a Mobility Management Entity (MME).

14. The apparatus of claim 13, wherein the information provisioning request message includes a Public Land Mobile Network Identity (PLMN ID) and a Machine Identity (MID).

15. The apparatus of claim 13, wherein the information provisioning response message includes at least one of a MID, the IMSI, the encrypted index of the security key, the profile, a PLMN ID, and a network type.

16. The apparatus of claim 13, wherein the controller encrypts a first random number (RAND1) included in the information provisioning request message, controls the transmitter to transmit to the UE the encrypted RAND1 and a second random number (RAND2) for verifying the UE, controls the receiver to receive an encrypted RAND2 from the UE, and verifies the UE by decrypting the encrypted RAND2.

* * * * *